United States Patent [19]

Barbe

[11] Patent Number: 4,765,571

[45] Date of Patent: Aug. 23, 1988

[54] AUTOMATIC LOAD-RELEASE APPARATUS FOR PARACHUTE EQUIPMENT

[75] Inventor: Guy Barbe, Marseilles, France

[73] Assignee: Societe Amatec, Saint Etienne, France

[21] Appl. No.: 29,203

[22] PCT Filed: Jun. 13, 1986

[86] PCT No.: PCT/FR86/00204

§ 371 Date: Feb. 11, 1987

§ 102(e) Date: Feb. 11, 1987

[30] Foreign Application Priority Data

Jun. 14, 1985 [FR]  France ............................. 85 09282

[51] Int. Cl.[4] ............................................. B64D 17/38
[52] U.S. Cl. ................................................ 244/151 B
[58] Field of Search ............... 244/150, 149, 151, 147, 244/148, 138 R; 294/82.24, 82.25, 82.3; 24/602, 643

[56] References Cited

U.S. PATENT DOCUMENTS

| | | |
|---|---|---|
| 2,414,023 | 1/1947 | Cooper . |
| 2,840,328 | 6/1958 | Moran ................................ 244/150 |
| 3,122,392 | 2/1964 | Benditt et al. . |
| 3,437,295 | 4/1969 | Istel et al. . |
| 3,466,081 | 9/1969 | Femia . |
| 3,468,502 | 9/1969 | Kinney ................................ 244/150 |

FOREIGN PATENT DOCUMENTS

| | | |
|---|---|---|
| 1138786 | 6/1957 | France ............................. 244/151 B |
| 1323217 | 2/1963 | France ............................. 244/151 B |
| 2244424 | 4/1975 | France . |
| 2430356 | 2/1980 | France . |
| 567795 | 10/1951 | Italy ................................. 244/151 B |
| 907964 | 10/1962 | United Kingdom ............ 244/151 B |

Primary Examiner—Galen Barefoot
Attorney, Agent, or Firm—Sandler & Greenblum

[57] ABSTRACT

The invention relates to an automatic mechanical apparatus comprising a container (1) placed within the equipment to be freed and from which leave two cables (3) within sheaths (2) which connect two controls retaining the loops of the equipment in the suspension straps worn by the parachutist.

The apparatus serves to exert a simultaneous pulling on the two cables (3) with a sufficient delay to cause the liberation of the equipment, after opening and stabilization of the parachute.

To this end, the container (1) contains a plunger (48) which is maneuverable by an inertia due to the deceleration caused by the opening of the parachute, the activation of a spring motor (25) having a decelerator whose slow rotation causes the delayed unlatching of a detent spring (11) causing the oscillation of a return lever (9) of the cables (3) for liberation of the equipment.

10 Claims, 8 Drawing Sheets

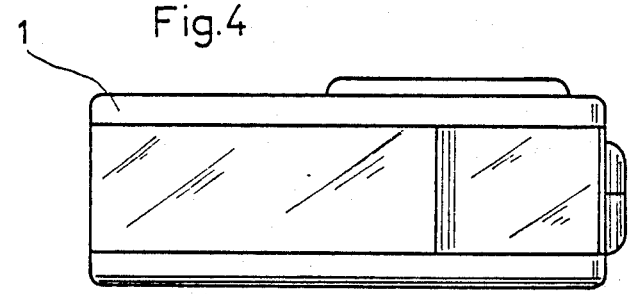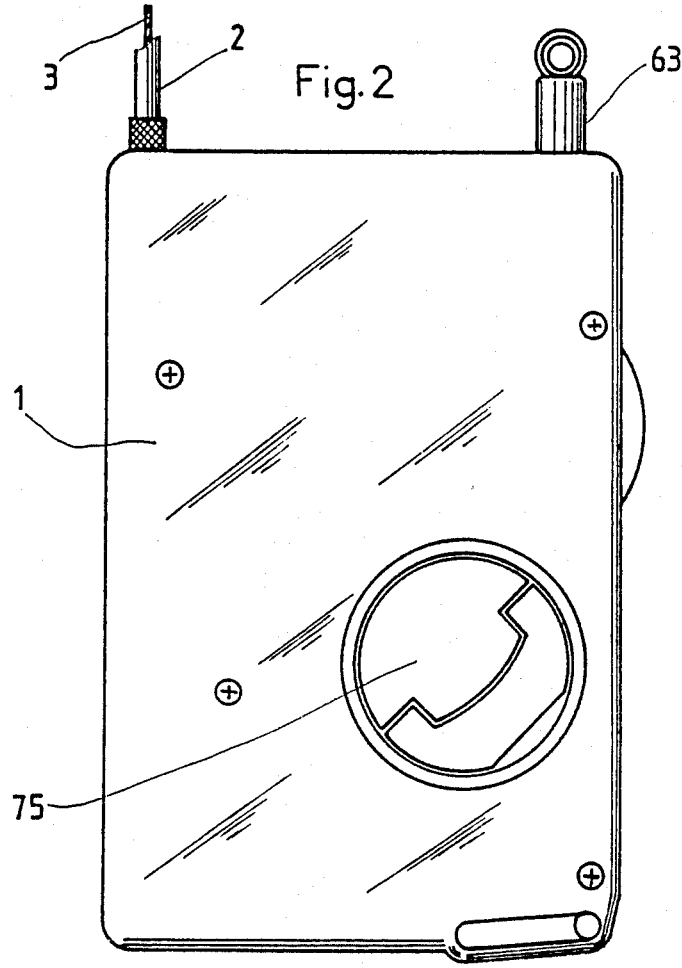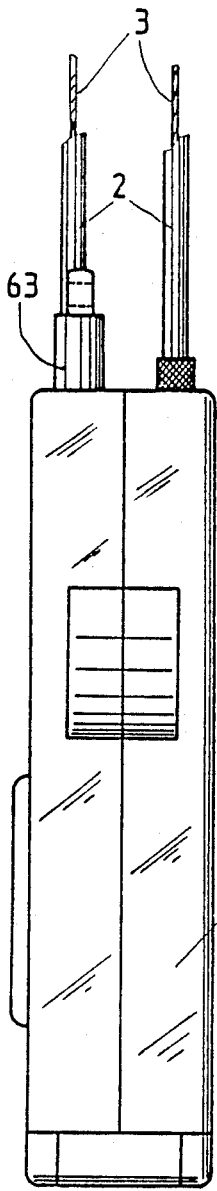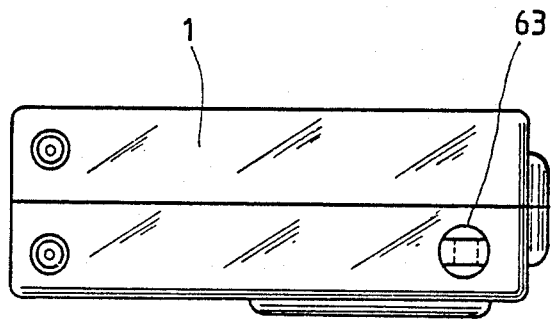

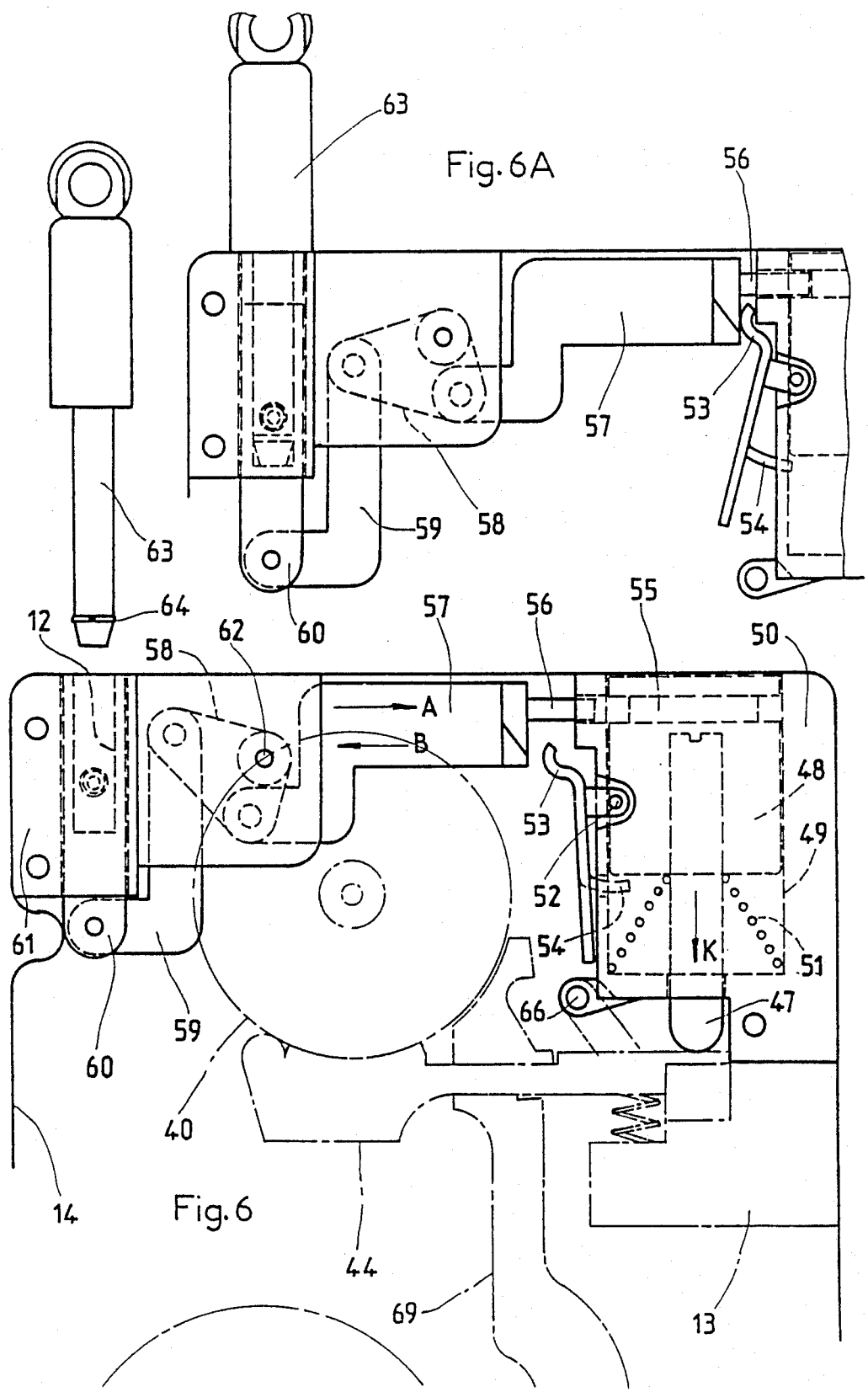

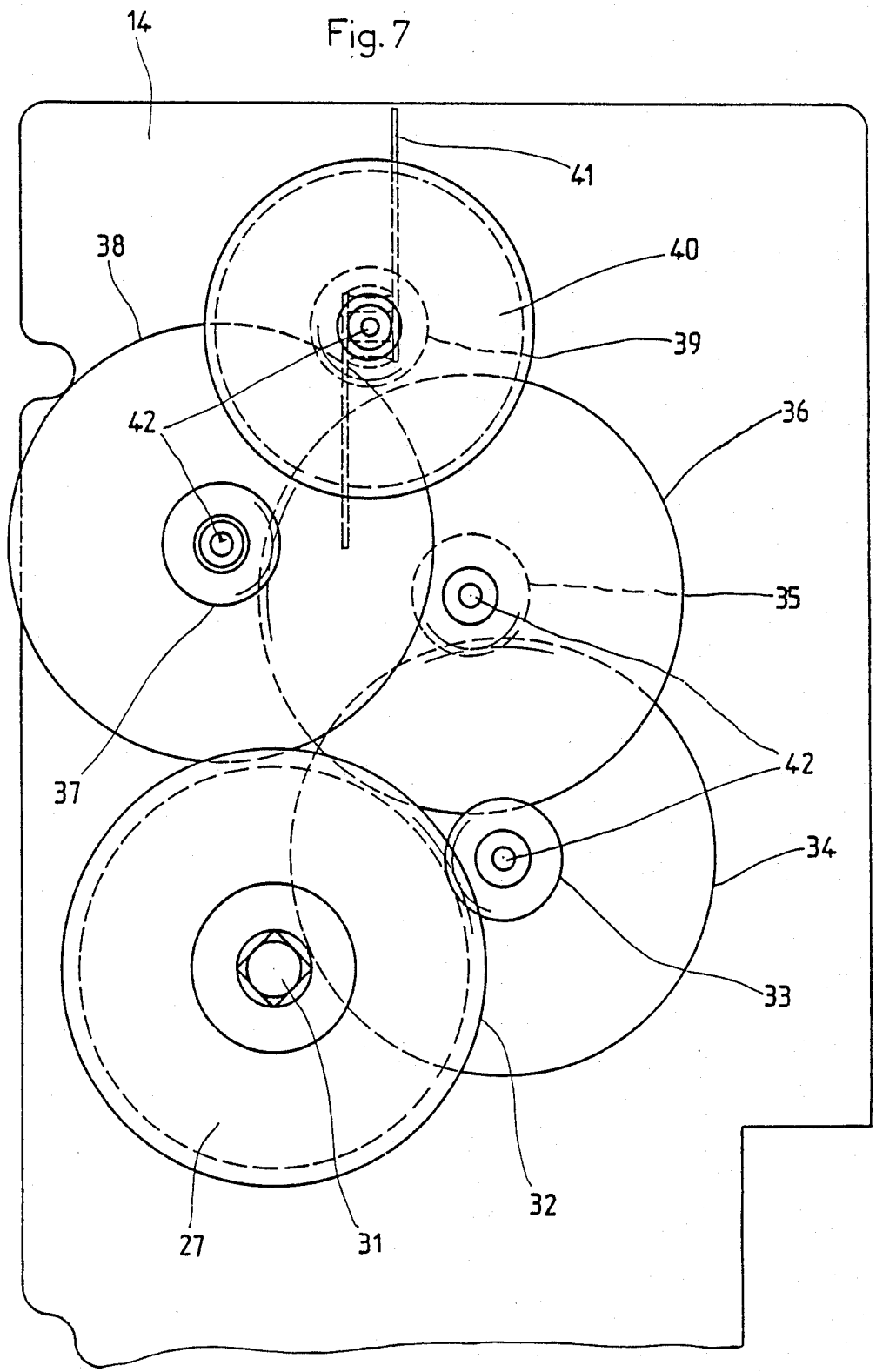

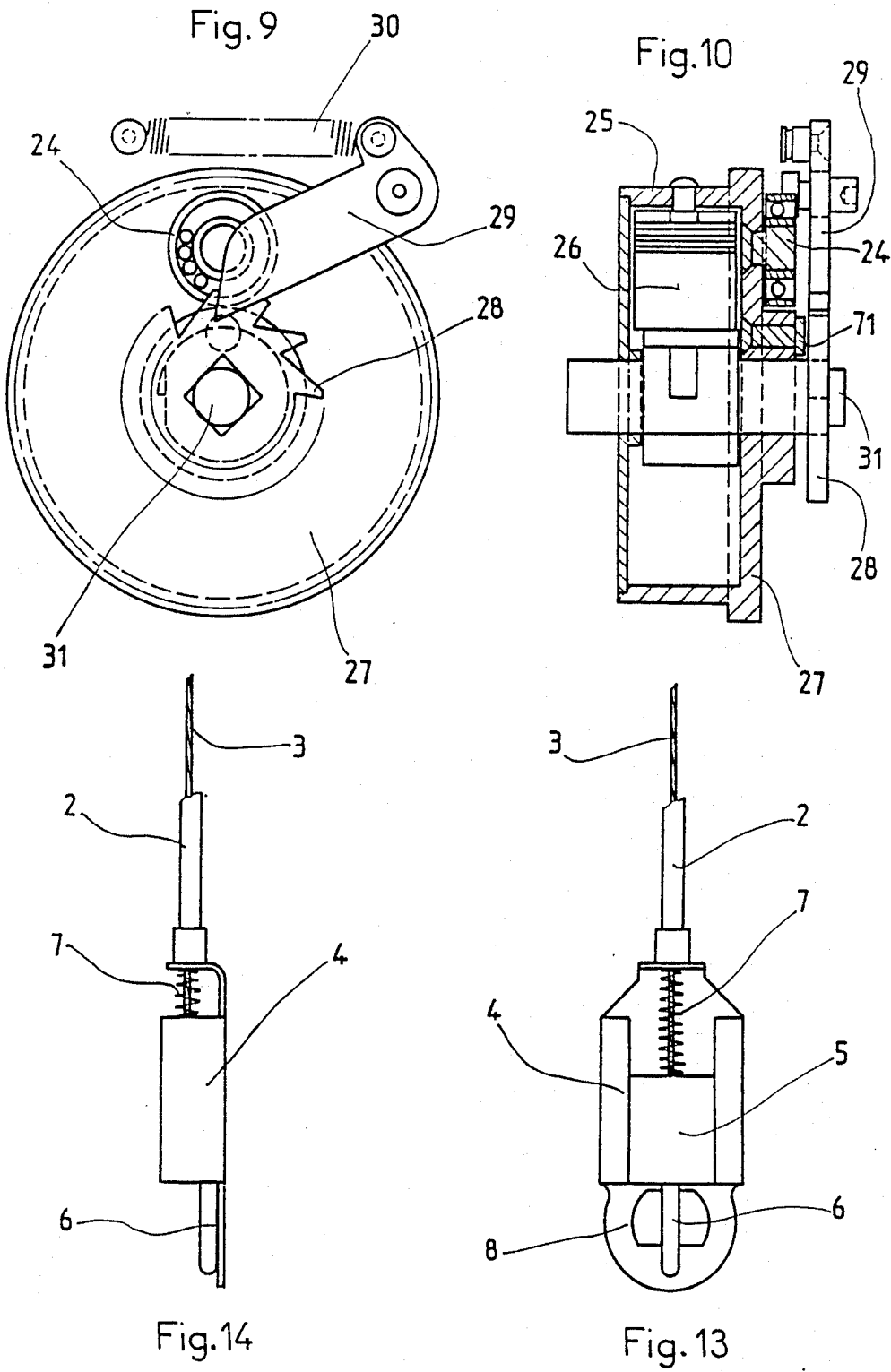

AUTOMATIC LOAD-RELEASE APPARATUS FOR PARACHUTE EQUIPMENT

BACKGROUND OF THE INVENTION

1. Field of the Invention

The present invention is directed as an apparatus adapted to automatically free the parachutist of his weapon sheath, or any other equipment, or material which he may carry, in the course of the jump and particularly after completion of the opening of the parachute.

Presently, the sheath which contains the equipment of the parachutist, for example, his weapon, or any other material, is released, but remains connected to the parachutist by a connection, e.g., a cord, cable or the like, several meters long, such that damage to the equipment upon arrival on the ground is minimized. To this end, the parachutist pulls on a handle which extracts two pins from two fastening loops of the sheath which couple the sheath to suspension straps. Consequently, the sheath is separated from the parachutist. Inasmuch as this operation must happen very rapidly, but only after the opening of the parachute, time is often a problem particularly low altitude jumps.

SUMMARY OF THE INVENTION

To overcome this disadvantage, relates an automatic mechanical apparatus of the present invention has been development which includes a container placed within the equipment to be released and from which protrude two cables within sheaths for connection two pin controls retaining the loops of the equipment in the suspension straps carried by the parachutist.

The apparatus is adapted to exert a simultaneous pulling on the two cables with a sufficient delay to cause the extraction of the pins thereby liberating the equipment sheath, after the opening and stabilization of the parachute.

To this end, the container contains a plunger which is maneuverable through inertia due to the deceleration caused by the opening of the parachute, to activate a spring motor having a decelerator whose slow rotation causes the delayed unlatching of a detent spring causing the oscillation of a return lever to liberate the cables of the equipment sheath.

To prevent inadvertant activation of the apparatus, the apparatus is provided with two safeties which successively block the plunger.

BRIEF DESCRIPTION OF THE DRAWINGS

The details of this apparatus as well as its operation will be better understood by the description which follows referring to the annexed drawings in which:

FIGS. 2, 3, 4 and 5 illustrate the container which contains the apparatus, respectively: from the front, FIG. 2; in profile, FIG. 3; from the bottom, FIG. 4; and from the top, FIG. 5.

FIG. 6 schematically shows from the front and, on an increased scale, the double safety system for activating the motor. FIG. 6A shows the second latching position of the system.

FIG. 7 shows from the front and, on a magnified scale, the motor and its decelerator.

FIGS. 9 and 10 are detailed views of the motor, respectively: in elevation, FIG. 9; and in profile cross-section, FIG. 10.

FIGS. 13 and 14 illustrate the detail of the cable heads, respectively: in elevation, FIG. 13; and profile FIG. 14.

DETAILED DESCRIPTION

Figure 1:
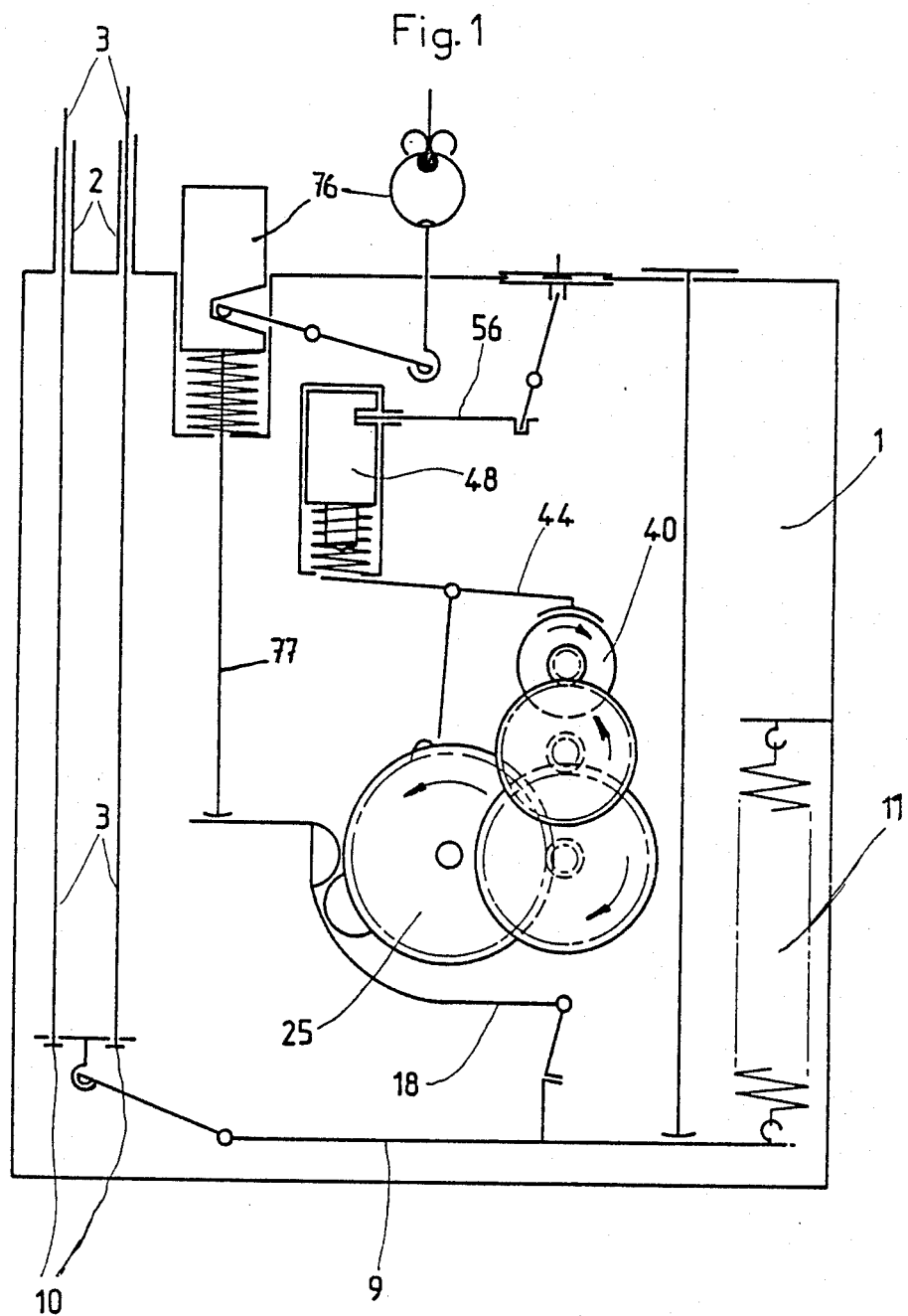
FIG. 1 is a schematic view of the principle of the automatic release apparatus of the invention.

In the drawings, numeral 1 designates the container shown as a housing composed of two attachable portions. Protruding from the housing are two cables 3 encased in two sheaths 2. The cables have free ends each of which is provided a head 4 (FIGS. 13 and 14) in the form of a guide for a slide 5 provided with a tongue 6. The slide 5 is rendered may be integral with the end of cable 3 and is pressed into the latching position by a spring 7, a position in which the tongue 6 passes in front of a ring 8 which forms the anterior portion of the head 4.

The other end of cables 3 penetrates into container 1, where it connects with a lever 9 in a manner so as to be capable of being released by means of an abutment 10. In the position shown in FIG. 12, the lever compresses a detent spring 11, retained by a stop 13 between two platens 14 attached in container 1 which support all the apparatus elements.

Figure 12:
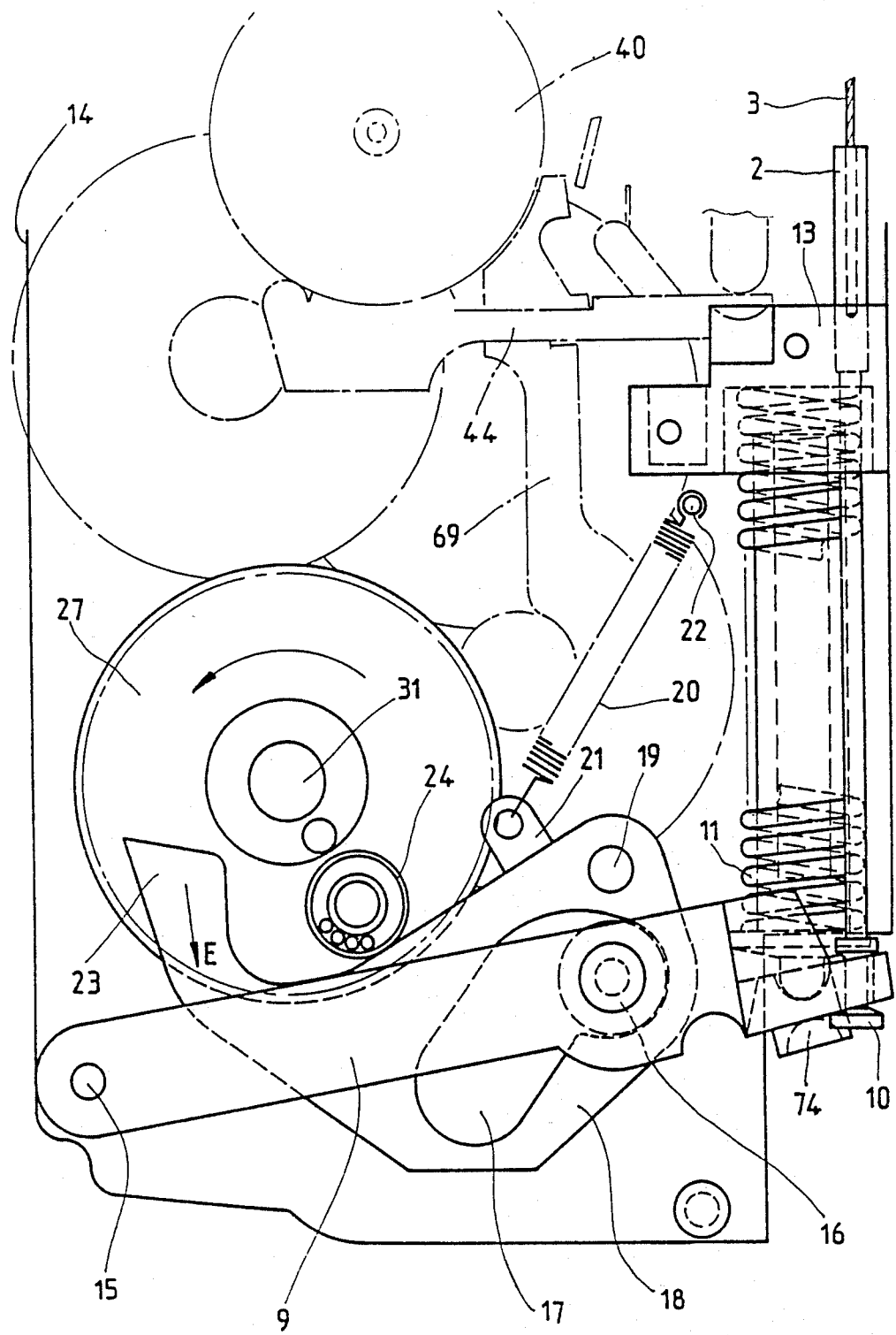
FIG. 12 is an elevational view on a scale identical to the cable pulling system.

Lever 9 is journalled to platens 14 by means of an oscillation axis 15. This lever 9 includes a ball bearing 16 inserted into a cutout 17 having a generally curved oblong shape, provided in a trigger 18 which is journalled by an axis 19 and is biased into a latching position, such as illustrated in FIG. 12, by a spring 20 attached to a flap 21 of the trigger and a finger 22 of the platen 14.

Trigger 18 forms a protrusion 23 adapted to cooperate with a ball bearing 24 centered on the toothed cheek plate 27 of a motor 25 equipped with an internal spriral spring 26, of conventional construction including a drum lodging the spring, a ratchet wheel 28 and a ratchet 29 biased into the teeth of the wheel 28 by a spring 30, as shown in FIGS. 9 and 10. As seen in FIG. 12, the ball bearing 24 is eccentric. The drum of motor 25 turns around an axis 31 attached to platens 14 of container 1.

Figure 8:
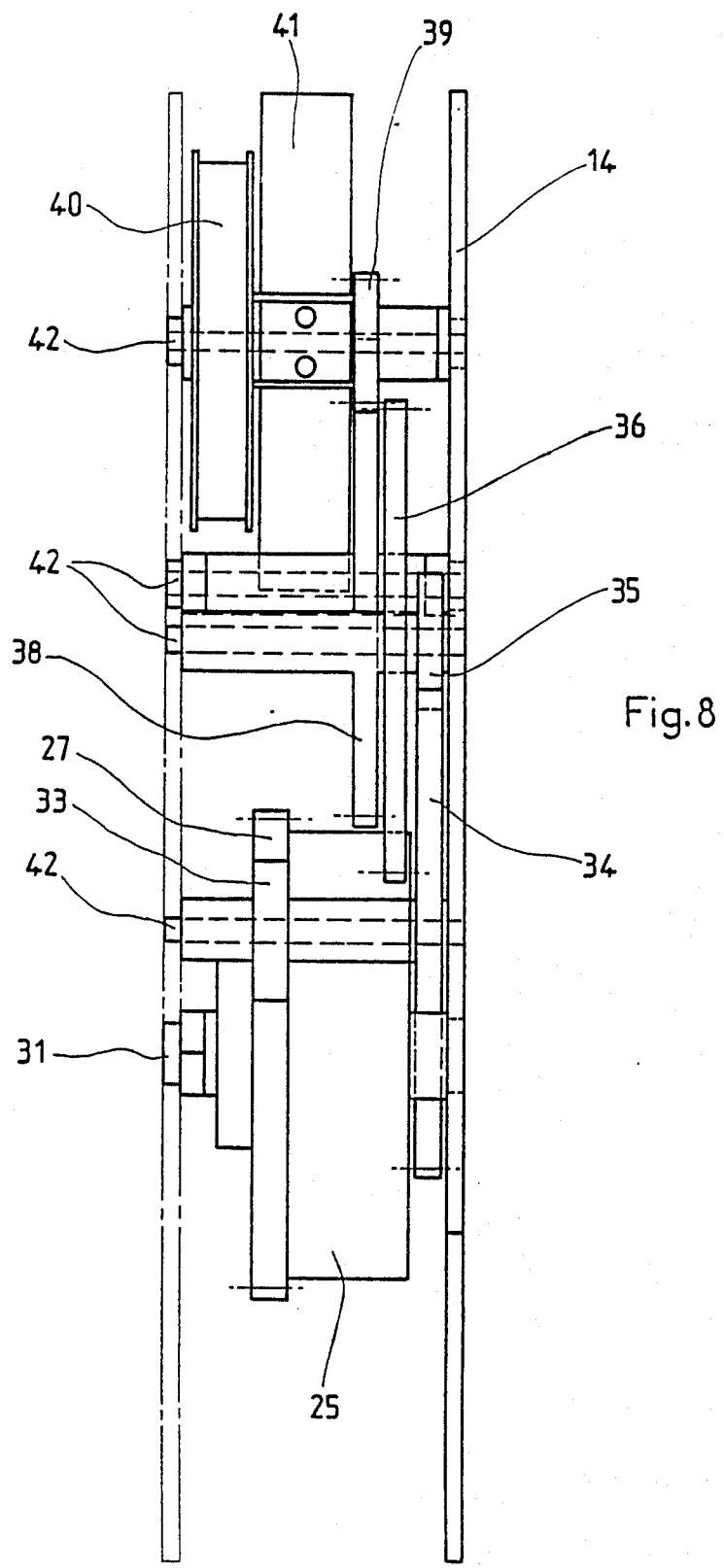
FIG. 8 is a profile view.

Cheek plate 27 of motor 25 forms a wheel 32 having a toothed peripery which drives a pinion 33 associated with a second toothed wheel 34, which is driven by a second pinion 35 integral with a third toothed wheel 36, which cooperates with a third pinion 37 associated with a fourth toothed wheel 38 driven by pinion 39 of an inertial flywheel 40 equipped with two opposite blades 41 for stabilization of the speed of the flywheel 40. The gear train 27, 34, 36, 38 and the flywheel 40 are carried by two axes designated by the common numeral 42 and attached to platens 14 of container 1. These elements are shown in more detail in FIGS. 7 and 8.

Figure 11:
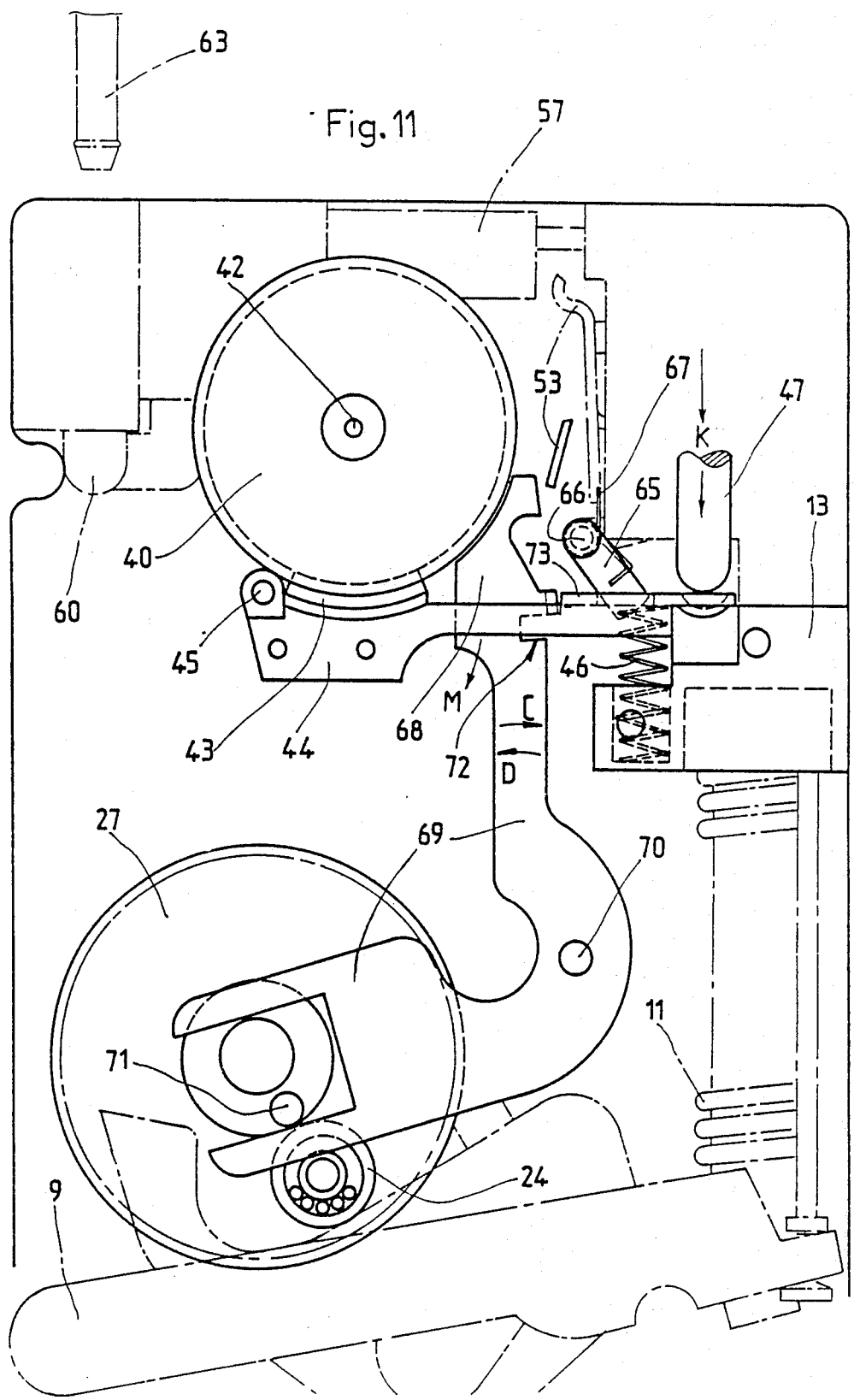
FIG. 11 is a front view of the start-stop control system of the apparatus on the same scale as in the preceding figures.

As illustrated in FIG. 11, the lining 43 of a brake 44 journalled around an axis 45 and biased in the braking position, by a spring 46 retained in stop 13 of detent spring 11 rests against the edge of the inertia flywheel 40.

This brake 44 is subjected to the action of finger 47 of a plunger 48 lodged in a bore 49 hollowed out of body 50 attached to platens 14 above stop 13, as shown in FIG. 6. Plunger 48 is biased in latching position by a spring 51.

A bolt 53, forming a bent flap 54 adapted to slide under the plunger is journalled at 52 to body 50 containing a plunger 48.

Plunger 48 is hollowed with an annular groove 55 to permit penetration by a lug 56 carried by a pusher 57 coupled, by a set of connecting rods to a slide 60 lodged in a guide 61 attached to platens 14. The set of connecting rods include, respectively, a triangular connecting rod 58 journalled to the guide by means of an axis 62, and a curved or bent rod 59.

The slide 60, controlling pusher 57, is hollowed out by a bore 12 to accommodate the introduction of a pin 63 provided at its end with a trim 64 serving as a retention brake.

A stop 65 journalled by an axis 66 can cooperate with brake 44 under the action of a spring 67, the details of which are illustrated more clearly in FIG. 11.

Brake 44 can likewise cooperate with head 68 of a fork 69 journalled to platens 14 by an axis 70. The fork 69 is activated by the head of a rivet 71 projecting from cheek plate 27 of motor 25. These elements are shown in FIGS. 10 and 11. The head 68 of the said fork is provided with a cut-out 72 which can be associated with a transverse member 73 of brake 44 when the latter is not tightened.

Although the schematic of FIG. 1 does not show the detail of the mechanical apparatus the schematic makes it possible to better understand the principle of operation of the inventive device as described herein.

To position the heads of cables 4 shown in more detail FIGS. 13 and 14 one slides element 5 with its tongue 6 by compressing spring 7 to disengage the opening of ring 8, so as to allow for the passage of the fabric loop. By permitting the slide 5 to slowly come back, the tongue 6 penetrates into the loop and thus latches the attachment system of the sheath to the parachutist.

Referring now to FIG. 6, the placement in operation of the apparatus occurs by introducing the pin 63 on the bottom in bore 12 of slide 60, which advances pusher 57 in the direction of the arrow A by means of the set of connecting rods 59 and 58. Lug 56 of pusher 57 is then inserted into groove 55 of plunger 48 which is latched. Lug 56 thus takes up the relay of bolt 53 which has pivoted under the action of pusher 57 and made flap 54 escape from plunger 48.

The pin 63 is connected to a cord which carries a snaphook at its other end. In the airplane, but well before the jump, the snaphook is joined to the handle of the automatic opening system of the parachute, that the parachutist carries in a chest pocket. The pin 63 still being in place, the apparatus is always in safety.

At the moment of the jump, on the command to hook up the automatic opening system to the cable which is stretched along the ceiling of the airplane, the pin 63 is extracted from the apparatus, the length of the cord having been appropriately adjusted. This operation causes the unlatching of the plunger 48, the pin 63 driving the slide 60, the bent connecting rod 59 and by the triangular connecting rod 58 the return of the pusher 57 in the direction of the arrow B, as shown in FIG. 6. The apparatus is then ready to operate. However, if for any reason the parachutist wanted to override the automation, this can be done by reintroducing the pin 63 in its place to latch the plunger 48. The parachutist can then, when it appears right to him, act on a manual control 76 to make the apparatus function. To this end, one can provide a shaft 77 acting directly on the protrusion 23 of the trigger 18 to unlatch lever 9 as shown in FIGS. 1 and 12.

When the parachute opens there is a sudden deceleration which serves to move the plunger 48 in the direction of arrow K as shown in FIG. 6. Its finger 47 lowers the control of brake 44 which oscillates in the direction of arrow M by compressing spring 46. Simultaneously, stop 65, under the action of its spring 67, oscillates and latches brake 44 in lowered position shown in FIG. 11.

The flywheel 40, being no longer braked, permits spring motor 25 to turn and drive the gear train 33–39 as well as the flywheel thereby causing a slow rotation the timing of which cause contributes to the slowing of motor 25. The speed of the inertia flywheel 40 is stabilized by the two blades 41 shown in more detail in FIG. 7.

With the execution of start-up, motor 25 programs the various functions necessary for completing a cycle which occurs in one turn of toothed wheel 27 shown in FIGS. 7, 8, 11 and 12.

In the course of the rotation of the motor, the rivet head 71 shown in FIG. 11 causes fork 69 to pivot around its axis 70 in the direction of the arrow C. Head 68 of the fork expels stop 65 and replaces it in its function of maintaining in low position the brake control 44. Simultaneously head 68 of fork 69 pushes latch 53 in the safety position shown in dashed lines, again assuring the blockage of the plunger 48.

Motor 25 continues to turn slowly and roller 24, integral with flange 27 presses on protrusion 23 of the trigger 18 and moves it in the direction of arrow E shown in FIG. 12. At the end of its extent, the trigger 18 pivots on its axis 19 and frees roller 16 of lever 9 which is then facing oblong slot 17 and is no longer blocked. Inasmuch as lever 9 is no longer latched, the compressed spring 11 can then suddenly expand and cause lever 9 to oscillate on its axis 15. A traction results on cables 3 through their abutment 10 engaged in lever 9 which causes the retraction of the tongues 6 sliding in the heads of cables 4 as shown in FIGS. 13 and 14.

The loops of the sheath are then freed. The sheath can separate itself from the suspension straps which secure it to the parachutist.

After the release of the sheath, motor 25 continues to turn and the roller 24 escapes from protrusion 23 of trigger 18 to allow for the rearming of the apparatus.

As soon as roller 24 is put into contact with protrusion 23 of trigger 18, the liberation or release phase is started. The head of rivet 71 causes the return of fork 69 in the direction of arrow D which unlatches brake control 44. Under the impulse of spring 46, the control of brake 44 brings back lining 43 into contact with inertia flywheel 40 which stops its rotation and, consequently, that of motor 25 (FIG. 11).

The rearming of the pulling mechanism of cables 3 occurs by means of an apparatus, not shown, which includes a cylindrical shaft integral with a retractable control journalled to the base of container 1 shown in FIG. 2. Referring now to FIG. 12, the shaft penetrates under container 1 through a hole situated in the axis of spring 11. The end of the shaft is hemispheric and is positioned in a base 74 of a corresponding shape provided under the end of lever 9. The oscillating movement of the control pivots lever 9 and compresses spring 11. Roller 16 returns to slot 17 and trigger 18 is returned by its spring 20. Roller 16 penetrates into the bent portion of slot 17 and latches lever 9.

The rearming of motor 25 occurs by means of a key 75, shown in FIG. 2 which drives axis 31 shown in FIG. 10 and compresses the internal spring 26.

Of course, the invention is not limited to the single embodiment which has just been described. It embraces on the contrary all alternative embodiments comprising equivalent means.

I claim:

1. An automatic release apparatus for equipment contained in a pack having suspension straps with loops to be worn by a parachutist comprising a housing adapted to be associated with said pack; cables protruding from said container; controls connected to ends of said cables having pins for fastening to said loops, a plunger subject to deceleration caused by opening a parachute worn by said parachutist in communication with a motor via a flywheel located within said housing, said motor being activated by said plunger to slowly rotate thereby causing a delayed unlatching of a detent spring to permit an oscillation of a lever for pulling said cables to release said pins from said loops and, simultaneously, a latching of said plunger (48) to prevent accidental operation.

2. The apparatus according to claim 1, wherein said plunger comprises a finger adapted to act against a spring to control a brake adapted to press against an edge of said flywheel coupled to said motor by a reducing gear train so as to permit said motor to slowly rotate.

3. The apparatus according to claim 2, wherein said flywheel is equipped with two blades for stabilization mounted opposite one another on an axis of said flywheel.

4. The apparatus according to claim 1, wherein said motor comprises a drum housing a spiral spring wound by a key, and an axis equipped with a ratchet wheel and a ratchet to permit said motor to slowly rotate in a single direction.

5. The apparatus according to claim 1, wherein said motor is provided with cheek plates, at least one of said cheek plates comprising an eccentric rivet having a head cooperating with a fork journalled on an axis, said head being adapted to simultaneously hook a control for a brake to prevent said control from returning to a position for braking said flywheel and to maneuver said latch of said plunger.

6. The apparatus according to claim 1, wherein said motor is provided with cheek plates and at least one of said cheek plates is equipped with an eccentric ball bearing which cooperates with a protrusion of a trigger journalled by an axis and is associated with a lever for pulling said cables by means of a ball bearing penetrating a slot in said trigger to permit a latching and an unlatching of said trigger.

7. The apparatus according to claim 1, comprising a pin moveably inserted in a slide located in said housing adapted to permit a latching of said plunger by means of a lug of a pusher maneuvered by a set of connecting rods associated with said slide wherein an extraction of said pin from said slide allows for said unlatching of the plunger.

8. The apparatus according to claim 1, wherein said controls comprise a guide for a slide equipped with a tongue restrained by a spring in front of a ring extending from said guide.

9. The apparatus according to claim 1, comprising a detent spring equipped with a control journalled to said housing provided with a shaft adapted to act on an end of a lever for pulling said cables to permit a rearming of a detent spring.

10. The apparatus according to claim 1, comprising a manual control for maneuvering a trigger for unlatching said lever for pulling said cables to permit decompression of a spring.

* * * * *

UNITED STATES PATENT AND TRADEMARK OFFICE
CERTIFICATE OF CORRECTION

PATENT NO. : 4,765,571

DATED : August 23, 1988

INVENTOR(S) : Guy BARBE

It is certified that error appears in the above-identified patent and that said Letters Patent is hereby corrected as shown below:

Column 2, line 42, change "spriral" to ---spiral---.

Column 2, line 51, change "peripery" to ---periphery---.

Column 3, line 30, change "detail" to ---details---.

Column 1, line 25, insert ---for--- after "particularly".

Column 1, line 25, insert ---,--- after "problem".

Column 1, line 29, delete "relates".

Column 1, line 31, change "development" to ---developed---.

Column 1, line 33, insert ---with--- after "connection".

Column 1, lines 33-34 insert ---,--- after "controls".

Column 1, line 42, delete "the" before "deceleration".

Column 3, line 30, insert ---,--- after "apparatus".

Column 3, line 34, insert ---in--- after "detail".

Column 3, line 34, insert ---,--- after "14".

Column 3, line 53, change "that" to ---which---.

Column 4, line 29, insert ---,--- after "simultaneously".

UNITED STATES PATENT AND TRADEMARK OFFICE
CERTIFICATE OF CORRECTION

PATENT NO. : 4,765,571

DATED : August 23, 1988

INVENTOR(S) : Guy BARBE

It is certified that error appears in the above-identified patent and that said Letters Patent is hereby corrected as shown below:

Column 4, line 30, insert ---,--- after "position".
Column 4, line 33, insert ---,--- after "27".
Column 5, line 4, insert ---,--- after "2".
Column 5, line 4, insert ---,--- after "31".
Column 5, line 5, insert ---,--- after "10".

Signed and Sealed this

Thirtieth Day of May, 1989

Attest:

DONALD J. QUIGG

Attesting Officer

Commissioner of Patents and Trademarks